ус008938867В2

(12) United States Patent
Filiatrault et al.

(10) Patent No.: US 8,938,867 B2
(45) Date of Patent: Jan. 27, 2015

(54) TRANSMISSION DEVICE AND PORTABLE BORING-WELDING APPARATUS USING THE SAME

(75) Inventors: Stéphane Filiatrault, Palmarolle (CA); Guy Filiatrault, Palmarolle (CA)

(73) Assignee: Usinage Filiatrault Inc., Palmarolle, Quebec (CA)

( * ) Notice: Subject to any disclaimer, the term of this patent is extended or adjusted under 35 U.S.C. 154(b) by 810 days.

(21) Appl. No.: 13/182,790

(22) Filed: Jul. 14, 2011

(65) Prior Publication Data

US 2013/0014363 A1    Jan. 17, 2013

(51) Int. Cl.
*B23P 23/04*    (2006.01)
*B23P 6/00*    (2006.01)
*B23K 28/02*    (2014.01)
(Continued)

(52) U.S. Cl.
CPC ............... *B23K 20/125* (2013.01); *B23P 23/04* (2013.01); *B23K 2201/06* (2013.01); *B23K 37/0247* (2013.01); *B23P 6/00* (2013.01); *B23K 28/02* (2013.01); *B23K 37/0276* (2013.01); *B23B 39/10* (2013.01); *B23Q 37/002* (2013.01);
(Continued)

(58) Field of Classification Search
CPC ....................................................... B23P 23/04
USPC ............ 29/26 A, 26 B, 26 R, 560; 219/76.14, 219/76.1; 408/132, 137–138; 228/45
See application file for complete search history.

(56) References Cited

U.S. PATENT DOCUMENTS 4,527,039 A *   7/1985   Füwesi ...................... 219/76.14
4,550,235 A *   10/1985   Fuwesi ...................... 219/76.14
(Continued)

FOREIGN PATENT DOCUMENTS

CN          2923156 Y *   7/2007
WO    WO-03/053625 A1 *   7/2003
WO    WO-2013/153430 A1 *   10/2013

OTHER PUBLICATIONS

Machine Translation of CN 2923156 Y, which CN '156 was published Jul. 2007.*
(Continued)

*Primary Examiner* — Erica E Cadugan
(74) *Attorney, Agent, or Firm* — Roylance, Abrams, Berdo & Goodman, L.L.P.

(57) ABSTRACT

There is provided a transmission device comprising a rigid casing configured to be mounted perpendicularly on a pair of parallel rotatable driving and driven shafts. Annular driving and driven gears are provided in the casing. The annular driving gear is adapted for rotating simultaneously with the driving shaft, and is also adapted for forwarding rotational motion of the inner section to a transmission device. The annular driven gear is adapted for engaging and rotating simultaneously with the driving shaft and sliding over the same, and for forwarding to the inner section rotational motion received from the transmission device. The transmission device is rotatively connected to the annular driving and driven gears for transmitting rotational movement of the driving shaft to the driven shaft. There is also provided a portable boring-welding apparatus using this transmission device and a method for rotating a driven shaft using a parallel driving shaft.

7 Claims, 11 Drawing Sheets

(51) Int. Cl.
*B23K 101/06* (2006.01)
*B23K 20/12* (2006.01)
*B23K 37/02* (2006.01)
*B23B 39/10* (2006.01)
*B23Q 37/00* (2006.01)
*F16H 3/34* (2006.01)
*F16H 59/04* (2006.01)
*F16H 25/20* (2006.01)

(52) U.S. Cl.
CPC ............... *F16H59/041* (2013.01); *F16H 3/34* (2013.01); *F16H 2025/2071* (2013.01)
USPC ............... 29/26 A; 29/560; 228/45; 219/76.1; 408/132; 408/138

(56) References Cited

U.S. PATENT DOCUMENTS

| | | | | |
|---|---|---|---|---|
| 5,350,259 A * | 9/1994 | Russo | ........................... | 408/137 |
| 5,376,061 A * | 12/1994 | Suzuki | ........................... | 29/564 |
| 6,073,322 A * | 6/2000 | Russo | ........................... | 29/26 A |
| 6,295,707 B1 * | 10/2001 | Siracusa | ....................... | 29/26 A |
| 6,653,589 B2 * | 11/2003 | Dolton et al. | .............. | 219/76.14 |
| 6,737,608 B2 * | 5/2004 | Esslinger et al. | ......... | 219/76.14 |
| 7,020,942 B2 * | 4/2006 | Siracusa | ....................... | 29/26 A |
| 2011/0024394 A1 * | 2/2011 | Esslinger | ..................... | 219/76.1 |

OTHER PUBLICATIONS

Brochure entitled "Portable Line Boring Machine" of Hofmann Engineering Pty Ltd., Perth, Australia, 2003.

Website printout of: http://www.sirmeccanica.us/page/ws1.php?cat1=WS for WS Series of Sir Meccanica S.p.A., Catanzaro, Italy, 2010.

Brochure entitled "Supercombinata SC1 40/1" of Elsa s.r.l., Sellia Marina, Italy 2011.

* cited by examiner

TRANSMISSION DEVICE AND PORTABLE BORING-WELDING APPARATUS USING THE SAME

TECHNICAL FIELD

The invention relates to transmission devices. More precisely, the invention relates to a transmission device and to a portable boring-welding device using the same.

BACKGROUND

Bores are common mechanical structures found on a large number of mechanical equipment, such as excavators or the like. Bores may be used for different purposes, for instance to receive a shaft or a pin to form a hinge. Even the cylinders of an engine may be considered as bores.

It is widely known that bores tend to get worn and damaged during their normal use or when subjected to a particularly intensive effort. Cracks may form on the sidewall of the bore, which may compromise the structural integrity of the equipment or of part of the equipment.

Various techniques, including boring and welding, are usually available to repair the bore. To perform these operations, a portable boring-welding machine may be used. This machine allows a user to alternatively perform boring and welding operations on the same workpiece. This type of machine is particularly useful to repair bores on large pieces of equipment which would be difficult or even impossible to move and install on a standard machine tool, because the portable boring-welding machine may be mounted directly on the piece to repair.

A portable boring-welding machine typically comprises a shaft which axially engages the bore and a tool mounted to the shaft for performing the boring and/or welding operation. A feed mechanism may also be provided to move the shaft axially along a certain length of the inner wall of the bore. During operation of the machine, the shaft is also rotated to allow a tool to move in a circular path against the inner wall.

However, the shaft is usually not rotated at the same speed during welding and during boring.

During boring, the shaft is rotated at a relatively high speed and with a certain torque in order to enable a boring tool to penetrate the inner wall of the bore. To provide the desired speed and torque, a hydraulic motor is typically used to rotate the shaft during boring.

During welding, the shaft is rotated at a relatively low speed and requires little, if any, torque, but usually requires the rotation speed of the shaft to be set with relatively higher precision than during boring.

To rotate the shaft at this lower speed, a speed reducer may be used. Example of a product on the market using such a technology includes the Portable Line Boring Machine MKIII™ manufactured by Hoffman Engineering Pty Ltd. (Perth, Australia).

Unfortunately, this increases the torque provided by the shaft, and this relatively high torque may damage the welding tool when performing a welding operation. A torque limiter may further be coupled to the speed reducer in order to limit the torque provided to the shaft, but this configuration does not eliminate the possibility that the limiter may fail during operation and damage the machine and/or the bore. Furthermore, the addition of two devices, namely a speed reducer and a torque limiter, would further increase the weight and complexity of the machine, which would then become costlier to manufacture and operate.

It has also been suggested to use a separate motor, such as an electric motor, which may allow the shaft to be rotated at a lower speed during welding without providing unnecessary torque. Examples of products on the market using such technology includes the WS™ series manufactured by Sir Meccanica S.p.A. Italia (Cantazaro, Italy); Elsa™ and the Supercombinata series sold by Penouest (France).

Unfortunately, this configuration implies providing an additional motor on the machine, which may also make the portable boring-welding machine more complex and thus costlier to manufacture and operate.

There is therefore the need for a device which would overcome at least one of the above-identified drawbacks.

Features of the invention will be apparent from review of the disclosure, drawings and description of the invention below.

BRIEF SUMMARY

According to one aspect, the invention relates to a transmission device. According to a particular embodiment, the transmission device comprises: a rigid casing configured to be mounted perpendicularly on a pair of parallel rotatable elongated shafts, said shafts consisting of a driving shaft and a driven shaft, the rigid casing comprising: first and second circular openings for introducing said elongated shafts through the rigid casing, the first circular opening defining a first enclosure for receiving an annular driving gear and the second circular opening defining a second enclosure for receiving an annular driven gear; the annular driving gear comprising an inner section adapted for a substantially tight fit around the driving shaft and for rotating simultaneously therewith, an intermediate section rotating with the inner section, the intermediate section cooperating with the first enclosure to provide a secure rotatable connection of the annular driving gear relative to the casing, and an outer section rotating with the inner section, the outer section comprising driving means for forwarding rotational motion of the inner section to transmission means, the annular driven gear comprising an inner section adapted for a substantially tight fit around the driven shaft, the inner section comprising engaging means for engaging and rotating simultaneously with the driving shaft and sliding over the same; an intermediate section rotating with the inner section, the intermediate section cooperating with the second enclosure to provide a secure rotatable connection of the annular driven gear relative to the casing, and an outer section rotating with the inner section, the outer section comprising driven means for forwarding to the inner section rotational motion received from the transmission means; and the transmission means being rotatively connected to the outer sections of the annular driving gear and annular driven gear for transmitting rotational movement of the driving shaft to the driven shaft.

In one embodiment, the transmission means are disengageable and comprise an engaged position wherein rotation of the driving shaft and of the annular driving gear causes the rotation of the annular driven gear and of the driven shaft; and a disengaged position wherein the driving shaft and the annular driving gear are allowed to rotate without causing the rotation of the annular driven gear and of the driven shaft.

In one embodiment, the transmission means comprise a switch to be operated by a user, the switch extending outwardly from the casing for selectively setting the transmission means between the engaged or the disengaged positions.

In one embodiment, the switch comprises: an elongated coupling member pivotably mounted between the annular driving gear and the annular driven gear; at least one connecting gear rotatably mounted to the elongated coupling member for engaging the outer portion of at least one of the annular driving gear and the annular driven gear; a position selector rotatably mounted to the rigid casing and operable by the user for selectively moving the elongated coupling member between the engaged position and the disengaged position, wherein in the disengaged position at least one connecting gear is spaced from at least one of the annular drive gear and the annular driven gear and wherein in the engaged position said at least one connecting gear engages both the annular driving gear and the annular driven gear thereby transmitting rotational movement of the annular driving gear to the annular driven gear.

In one embodiment, the position selector comprises: a handle portion located outside the rigid casing and adapted to be operated manually by the user; and a finger portion extending into the casing and engaging the elongated coupling member for pivoting the elongated coupling member when the handle portion is operated.

In one embodiment, the inner section of the annular driving gear and the driving shaft have complementary shapes.

In one embodiment, the annular driven gear comprises a male mating portion for engaging a corresponding female mating portion on the driven shaft.

In one embodiment, the female mating portion comprises a longitudinal keyway and wherein the male mating portion comprises a key extending from the annular driven gear, the key being adapted for sliding in substantially tight fit manner within the female mating portion.

In one embodiment, the transmission device is configured to be mounted to a portable boring-welding apparatus comprising a feed shaft and a welding shaft, and wherein the driving shaft and the driven shaft consist of said feed shaft and said welding shaft, respectively.

In the preferred illustrated embodiment, the transmission device is removable from the portable boring-welding apparatus. However, the skilled addressee will appreciate that the transmission device could instead be mounted permanently to the portable boring-welding apparatus.

In one embodiment, the inner section of the annular driven gear comprises a tubular portion extending outwardly from the rigid casing through the second circular opening, the tubular portion being adapted to fit around the welding shaft and to be inserted in a rotating sleeve of the portable boring-welding apparatus in a substantially tight fit, thereby supporting the device when the rigid casing is mounted on the elongated shafts.

In one embodiment, the annular driven gear further comprises an outer low-friction sleeve engaged over the tubular portion for preventing the tubular portion from contacting the rotating sleeve and thereby preventing the driven shaft from being rotated by the rotating sleeve.

According to another aspect, the invention relates to a portable boring-welding apparatus for boring and welding a workpiece. According to a particular embodiment, the apparatus comprises: an external housing adapted to be removably secured to the workpiece in alignment with a bore thereof, the external housing comprising a cylindrical channel for inserting a welding shaft through the external housing; a feed motor secured inside the external housing, the feed motor being coupled to a feed shaft for rotating the feed shaft at a substantially low rotation speed suitable for welding, the feed shaft extending parallel to the welding shaft and being axially secured to the welding shaft for displacing the welding shaft axially through the circular housing opening upon rotation of the feed shaft; and a transmission device configured for transmitting rotational movement of the feed shaft to the welding shaft.

In one embodiment, the transmission device is removable and comprises: a rigid casing configured to be removably mounted perpendicularly on the feed shaft and the welding shaft, the rigid casing comprising: first and second circular casing openings for introducing said feed shaft and said welding shaft through the rigid casing, the first circular casing opening defining a first enclosure for receiving an annular driving gear and the second circular casing opening defining a second enclosures for receiving an annular driven gear; the annular driving gear comprising an inner section adapted for a substantially tight fit around the feed shaft and for rotating simultaneously therewith, an intermediate section rotating with the inner section, the intermediate section cooperating with the first enclosure to provide a secure rotatable connection of the annular driving gear relative to the casing, and an outer section rotating with the inner section, the outer section comprising driving means for forwarding rotational motion of the inner section to transmission means, the annular driven gear comprising an inner section adapted for a substantially tight fit around the welding shaft, comprising engaging means for engaging and rotating simultaneously with the driving shaft and sliding over the same; an intermediate section rotating with the inner section, the intermediate section cooperating with the second enclosure to provide a secure rotatable connection of the annular driven gear relative to the casing, and an outer section rotating with the inner section, the outer section comprising driven means for forwarding to the inner section rotational motion received from the transmission means; and the transmission means being rotatively connected to the outer sections of the annular driving gear and annular driven gear for transmitting rotational movement of the feed shaft to the welding shaft.

In one embodiment, the welding shaft is interchangeable with a boring shaft adapted to be rotated at a substantially high rotation speed.

In one embodiment, the apparatus further comprises a boring motor secured inside the external housing, the boring motor being operatively coupled to the boring shaft for rotating the boring shaft at the substantially high rotation speed.

In one embodiment, the feed motor is an electric motor and the boring motor is a hydraulic motor.

In one embodiment, the apparatus further comprises a rotating sleeve adapted for engaging and rotating simultaneously with the boring shaft and sliding over the same, the rotating sleeve rotatably engaging the cylindrical channel and cooperating therewith to provide a secure rotatable connection of the boring shaft relative to the casing, the rotating sleeve comprising coupling means for coupling the rotating sleeve to the boring motor such that the rotating sleeve rotates when the boring motor is actuated.

In one embodiment, the welding shaft has a smaller diameter than the boring shaft and is insertable through the rotating sleeve without contacting said sleeve.

According to yet another aspect, the invention also relates to a method for rotating a driven shaft using a driving shaft extending parallel to the driven shaft. According to a particular embodiment, the method comprises: (a) mounting perpendicularly on the driving shaft and the driven shaft a removable transmission device configured for transmitting rotational movement of the driving shaft to the driven shaft; (b) rotating the driving shaft, wherein rotational movement of the driving shaft is forwarded to the driven shaft by the removable transmission device.

In one embodiment, the removable transmission device comprises: a rigid casing configured to be mounted perpendicularly on the driving shaft and the driven shaft, the rigid casing comprising: first and second circular openings for introducing said driving shaft and said driven shaft through the rigid casing, the first circular openings defining a first enclosure for receiving an annular driving gear and the second circular opening defining a second enclosures for receiving an annular driven gear; the annular driving gear comprising an inner section adapted for a substantially tight fit around the driving shaft and for rotating simultaneously therewith, an intermediate section rotating with the inner section, the intermediate section cooperating with the first enclosure to provide a secure rotatable connection of the annular driving gear relative to the casing, and an outer section rotating with the inner section, the outer section comprising driving means for forwarding rotational motion of the inner section to transmission means, the annular driven gear comprising an inner section adapted for a substantially tight fit around the driven shaft, comprising engaging means for engaging and rotating simultaneously with the driving shaft and sliding over the same; an intermediate section rotating with the inner section, the intermediate section cooperating with the second enclosure to provide a secure rotatable connection of the annular driven gear relative to the casing, and an outer section rotating with the inner section, the outer section comprising driven means for forwarding to the inner section rotational motion received from the transmission means; and the transmission means being rotatively connected to the outer sections of the annular driving gear and annular driven gear for transmitting rotational movement of the driving shaft to the driven shaft.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
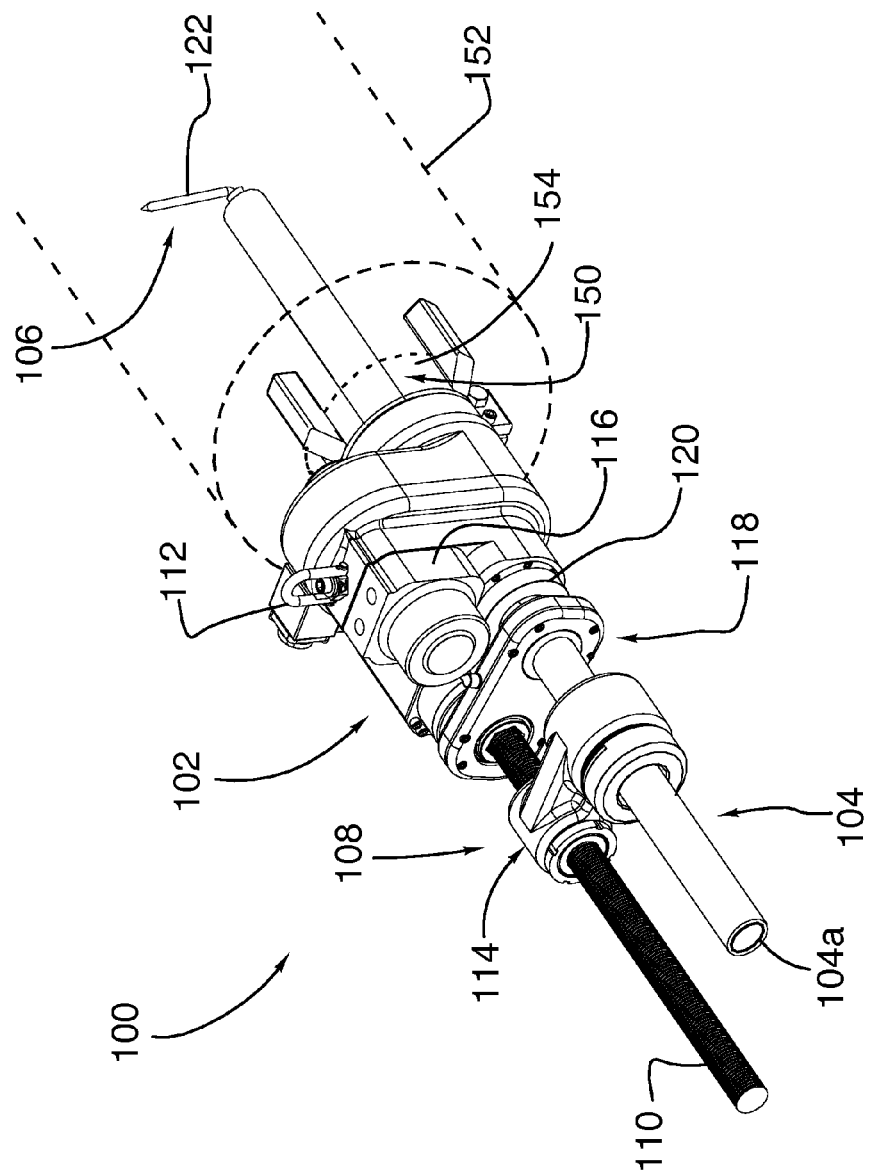
FIG. 1 is an elevated perspective view of a portable boring-welding apparatus, in accordance with one embodiment, with a welding shaft installed.
Figure 2:
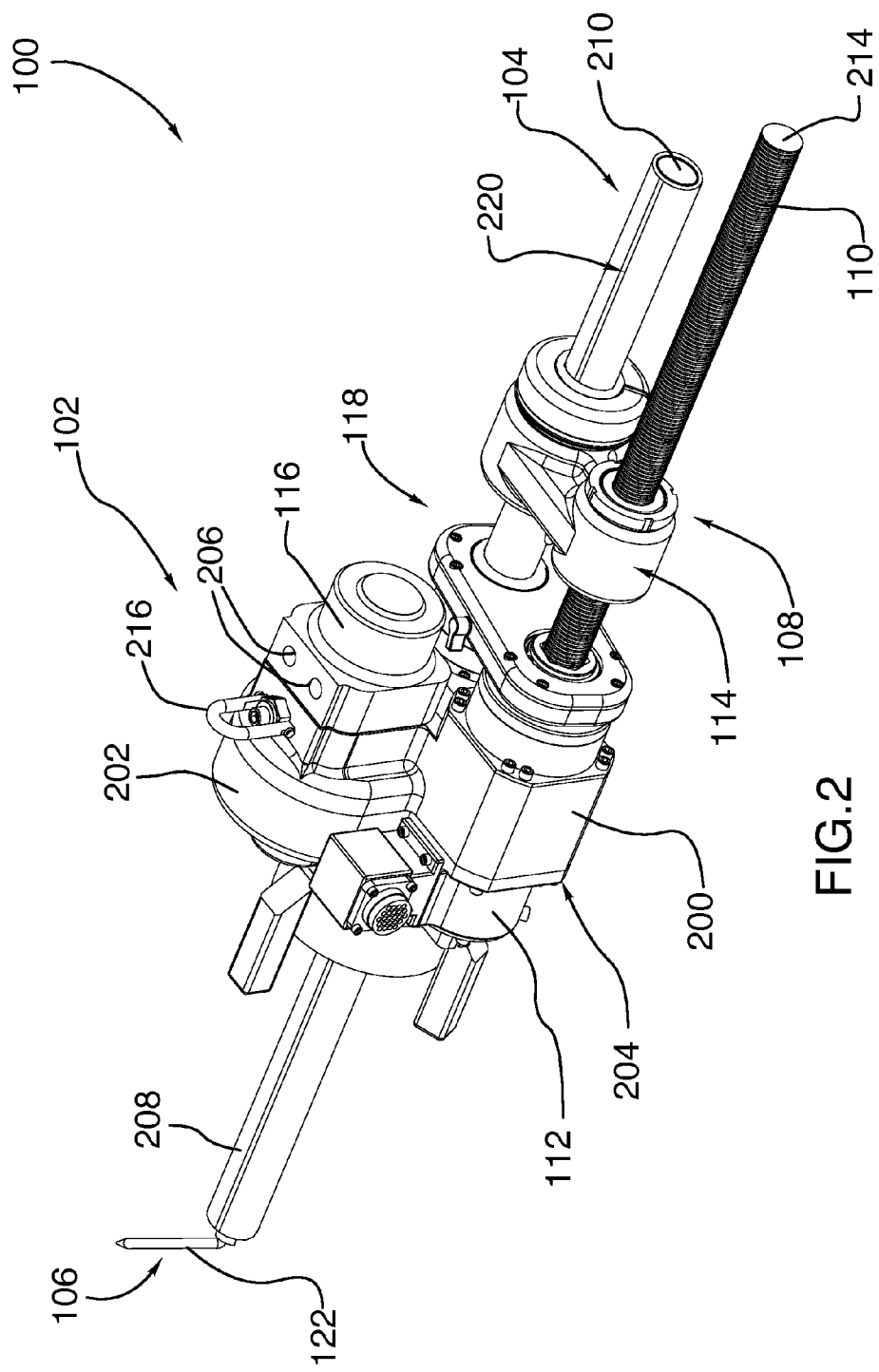
FIG. 2 is another elevated perspective view of the portable boring-welding apparatus shown in FIG. 1.

Referring first to FIGS. 1 and 2, there is provided a portable boring-welding apparatus 100, in accordance with one embodiment. The portable boring-welding apparatus 100 may be used to machine a bore 150 defined in a workpiece 152, for instance to repair cracks formed on an inner wall 154 of the bore 150.

In the illustrated embodiment, the apparatus 100 comprises a body 102 mountable to the workpiece 152 and a driven shaft 104 rotatably mounted to the body 102. When the body 102 is properly mounted to the workpiece 152, part of the driven shaft 104 extends into the bore 150, substantially along the longitudinal axis of the bore 150.

A tool 106 is further mounted to the driven shaft 104. The tool 106 is adapted to be positioned inside the bore 150 and extends outwardly from the driven shaft 104 to contact the inner wall 154 of the bore 150. In one embodiment, the apparatus 100 is adapted for performing both boring and welding operations. The tool 106 may therefore be one of a welding tool and a boring tool. In the present embodiment, the driven shaft 104 is one of a welding shaft 104a, on which is mounted a welding tool and a boring shaft 104b, shown in FIG. 12, on which is mounted a boring tool 1200. The shafts 104a, 104b are interchangeable to allow a user to selectively perform a welding operation and a boring operation using the apparatus 100.

A feed mechanism 108 is further provided for selectively moving the shaft 104 towards and away from the workpiece 152. It will be appreciated that this causes the tool 106 to move along the inner wall 154 of the bore 150 for boring or welding the inner wall 154 along a certain length. In the illustrated embodiment, the feed mechanism 108 comprises a driving shaft, in this embodiment a feed shaft or feed screw 110, extending generally parallel to the driven shaft 104 and a feed motor, or feed actuator 112, operatively connected to the feed screw 110 for rotating the feed screw 110 about its longitudinal axis. In one embodiment, the feed actuator 112 comprises an electric step motor, which enables axial positioning of the tool 106 in the bore 150 with a relatively high precision. A connecting member 114 secured to the driven shaft 104 engages the feed screw 110 and is adapted for moving along the feed screw 110 when the feed screw 110 is rotated, as will become apparent below.

It will be appreciated that to perform a boring operation, the driven shaft 104 needs to be rotated at a relatively high speed and be provided with a certain torque, because the boring tool penetrates the inner wall 154 of the bore 150 which offers resistance against rotation of the driven shaft 104. For example, in some instances, the shaft 104 may be rotated at a speed comprises between 250 rpm and 300 rpm during boring. To rotate the shaft 104 during boring, a second actuator, or boring actuator 116, is mounted to the body 102 and operatively coupled to the driven shaft 104. In the illustrated embodiment, the boring actuator 116 comprises a hydraulic rotary actuator, which may provide the required torque and relatively high rotation speed to the driven shaft 104.

However, to perform a welding operation, the driven shaft 104 will generally be rotated at lower speeds, as one skilled in the art will appreciate. For example, in some instances, the driven shaft 104 may be rotated at a speed of about 1 rpm during welding. Furthermore, since the welding tool does not penetrate the inner wall 154 of the bore 150, little or no torque is required.

When a welding operation is performed, the boring actuator 116 is therefore left unused. Instead, according to one embodiment according to the invention, the apparatus 100 is provided with a transmission device 118 mounted to the body 102 of the apparatus 100, which couples the shaft 104 to the feed mechanism 108. The feed mechanism 108 is therefore used for moving the driven shaft 104 axially, towards and away from the workpiece 152, and also for rotating the driven shaft 104 during welding. It will be appreciated that the feed mechanism 108 is designed to move the driven shaft 104 axially at relatively low speed, compared to the rotation speed of the driven shaft 104 during boring. Therefore, the feed mechanism 108, via the transmission device 118, will cause the driven shaft 104 to rotate at relatively low speed during welding, which is suitable for a welding operation as one skilled in the art will appreciate.

This configuration advantageously allows both the rotation of the driven shaft 104 during welding and the axial movement of the driven shaft 104 to be performed using the same actuator, which eliminates the need to provide a first actuator for rotating the driven shaft 104 during welding and a second actuator to power the feed mechanism 108. This advantageously reduces the weight and cost of the apparatus 100.

Furthermore, it will be appreciated that an electric step motor is usually more precise than a hydraulic motor. Therefore, using the feed mechanism 108 to rotate the driven shaft 104 instead of using the boring actuator 116 provides a greater control over the rotation speed of the driven shaft 104, which is of great advantage to suitably perform a welding operation.

Now referring to FIGS. 1 to 3, components of the apparatus 100 will now be described in more details.

The body 102 comprises first and second housing portions 200, 202, which, when assembled, together form a housing 204 for housing the feed actuator 112 and the boring actuator 116.

Still in the illustrated embodiment, the boring actuator 116 comprises a hydraulic rotary actuator having a plurality of ports 206 connectable to a source of hydraulic fluid, as is known in the art. Hydraulic fluid is provided during boring, but the plurality of ports may be disconnected when performing a welding operation, which does not require the use of the boring actuator 116.

The boring actuator 116 is positioned in the housing 204 such that its rotation axis is offset relative to the driven shaft 104. Specifically, the boring actuator 116 is adjacent to a cylindrical channel, not shown for convenience, defined in the housing 204, for inserting the driven shaft 104 through the housing 204. An inner sleeve 120, adapted for engaging and rotating simultaneously with the boring shaft 104b and sliding over the boring shaft 104b, rotatably engages the cylindrical channel and cooperates therewith to provide a secure rotatable connection of the boring shaft relative to the transmission device 118. In the illustrated embodiment, the inner sleeve 120 is rotatably mounted in the cylindrical channel by means of bearings. The inner sleeve 120 comprises coupling means, such as an arrangement of gears shown in FIG. 3, for coupling the inner sleeve 120 to the boring actuator 116 such that the inner sleeve 120 rotates when the boring actuator 116 is actuated. To perform a boring operation, the boring shaft 104b is engaged in the inner sleeve 120 (as shown in more details in FIG. 12) and is secured therein such that it is prevented from rotating relative to the inner sleeve 120, but is still able to be moved axially by the feed mechanism 108.

Figure 3:
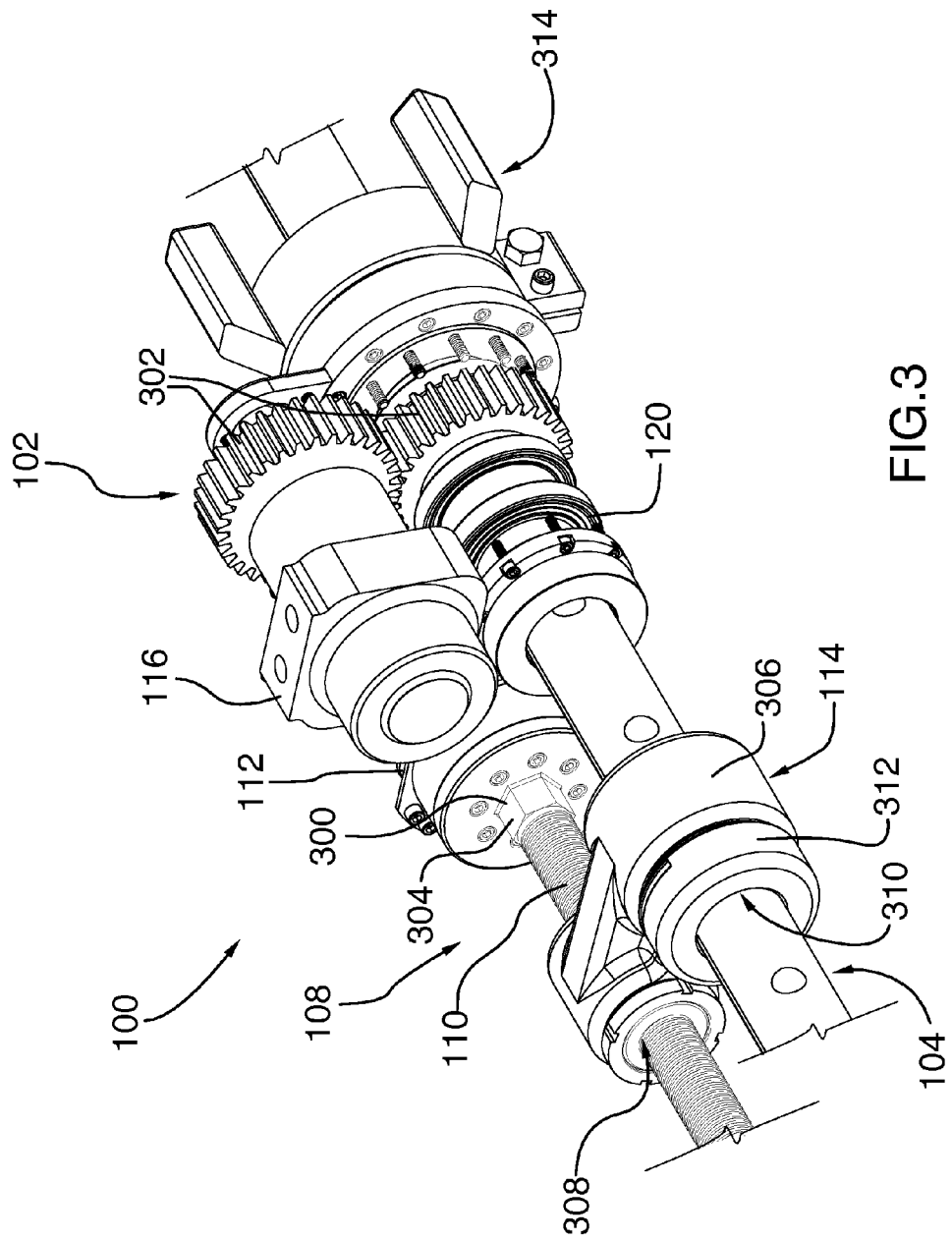
FIG. 3 is a detailed elevated perspective view of the body of the portable boring-welding apparatus shown in FIG. 1, with the transmission device and the housing removed to show inner details of the apparatus.

In the embodiment illustrated in FIGS. 1 to 3, the apparatus 100 is provided with the welding shaft 104a, which passes through the body 102. The welding shaft 104a has a first end 208 located near the workpiece 152 and a second end 210 located away from the first end 208.

In the illustrated embodiment, the tool 106 comprises a welding torch with a welding nozzle 122. The welding torch has been inserted into and is extending generally outwardly from the hollow driven shaft 104. More specifically, the welding nozzle 122 is operatively coupled to a suitable gas reservoir and the welding torch is coupled to a wire feed assembly via a hose, not shown, which delivers the gas and welding wire to the welding nozzle 122 as is widely known in the art. Various types of welding torch are suitable for use with the present invention, including but not limited to telescopic welding torches such as those sold by Bore Repair Systems.

In this embodiment, the welding shaft 104a is hollow and the first and second ends 208, 210 of the welding shaft 104a are open. The welding nozzle 122, connected to the hose, may be inserted through the second end 210 of the welding shaft 104a until it exits through the first end 208. The welding nozzle 122 may then be oriented outwardly and placed near the inner wall 154 of the bore 150 such that the welding wire contacts the inner wall 154. A person skilled in the art will further appreciate that the welding nozzle 122 may be further oriented at a desired angle relative to the inner wall 154 of the bore 150 to suitably perform a welding operation, as is known in the art.

To permit movement of the driven shaft 104 in an axial direction, the shaft 104 is coupled to the feed screw 110 by the connecting member 114. As shown in FIGS. 2 and 3, the feed screw 110 has a first end 300 secured to the feed actuator 112 and an opposed free end 214. The feed screw 110 extends parallel to the driven shaft 104, along the rotation axis of the feed actuator 112 such that rotation of the feed actuator 112 causes rotation of the feed screw 110. In the illustrated embodiment, the feed screw 110 is threaded along substantially its entire length, except for a root portion 304 located at its first end 300, which is configured to engage the transmission device 118, as will be further explained below.

The connecting member 114 comprises a connecting body 306 having first and second generally cylindrical openings 308, 310 extending through the connecting body 306. The first opening 308 is internally threaded and is sized and shaped for engaging the feed screw 110. The second opening 310 extends generally parallel to the first opening 308 and is sized and shaped to receive the driven shaft 104. More specifically, the connecting member 114 comprises an inner sleeve 312 concentrically mounted in the second opening 310. Once the driven shaft 104 is inserted into the inner sleeve 312, the shaft 104 is secured to the inner sleeve 312 to prevent the driven shaft 104 from moving axially relative to the connecting member 114. The inner sleeve 312 is further mounted on bearings to allow the inner sleeve 312, and therefore the driven shaft 104 secured thereto, to rotate relative to the connecting body 306.

It will be appreciated that the driven shaft 104, when received in the second opening 310, prevents rotation of the connecting member 114 about the feed screw 110. The rotation of the feed screw 110 in a first direction will therefore move the connecting member 114 axially along the feed screw 110 towards the body 102 of the apparatus 100. Since the driven shaft 104 is secured to the inner sleeve 312 of the connecting member 114, the driven shaft 104 will also move towards the workpiece 152. Similarly, rotation of the feed screw 110 in a second direction opposite the first direction will move the connecting member 114 away from the body 102 of the apparatus 100, and therefore will move the driven shaft 104 away from the workpiece 152.

In one embodiment, the boring actuator 116, the feed actuator 112 and the welding tool 106 are all operatively connected to a control unit, not shown, which enables the user to readily control all operations of the apparatus 100. The control unit may be programmed to perform welding and/or boring operations according to predetermined patterns or cycles, for instance. Alternatively, each one of the boring actuator 116, the feed actuator 112 and the welding tool 106 is connected to a distinct control unit.

In the illustrated embodiment, the body 102 further comprises a mounting assembly 314 for temporarily mounting the body 102 to the workpiece 152 to perform a boring and/or and a welding operation. The mounting assembly 314 prevents movement of the portable boring-welding apparatus 100 relative to the workpiece 152 during boring and welding, and may also be used to position the shaft 104 along the longitudinal axis of the bore 150. A lifting ring 216 may further be provided to suitably position the apparatus 100 near the bore 150 before mounting the apparatus 100 to the workpiece 152 using the mounting assembly 314.

Now referring to FIGS. 4 to 11, the transmission device 118 will be described. In this embodiment, the transmission device 118 is removable from the apparatus 100 so that it can be used for rotating the welding shaft 104*a* during welding and removed during boring. However, the skilled addressee will appreciate that the transmission device 118 could instead be permanently mounted to the apparatus 100. For instance, the transmission device 118 could be welded to the housing 204 of the body 102, or secured thereto using rivets.

The transmission device 118 comprises a rigid casing 400 configured to be mounted perpendicularly on a pair of parallel rotatable elongated shafts, which, in this embodiment, consist of the feed screw 110 and the driven shaft 104, as shown in FIGS. 1 and 2.

In the illustrated embodiment, the rigid casing 400 is generally rectangular and comprises first and second casing portions 420, 422 which are joinable by means of fasteners 424 such as screws or the like. Each one of the casing portions 420, 422 comprises first and second circular openings 808, 806 for introducing the feed screw 110 and the driven shaft 104 through the rigid casing 400. The first circular opening 808 defines a first enclosure, or first recess 810*a*, for receiving an annular driving gear 404 and the second circular opening 806 defines a second enclosure, or second recess 810*b*, for receiving an annular driven gear 402.

Figure 6:
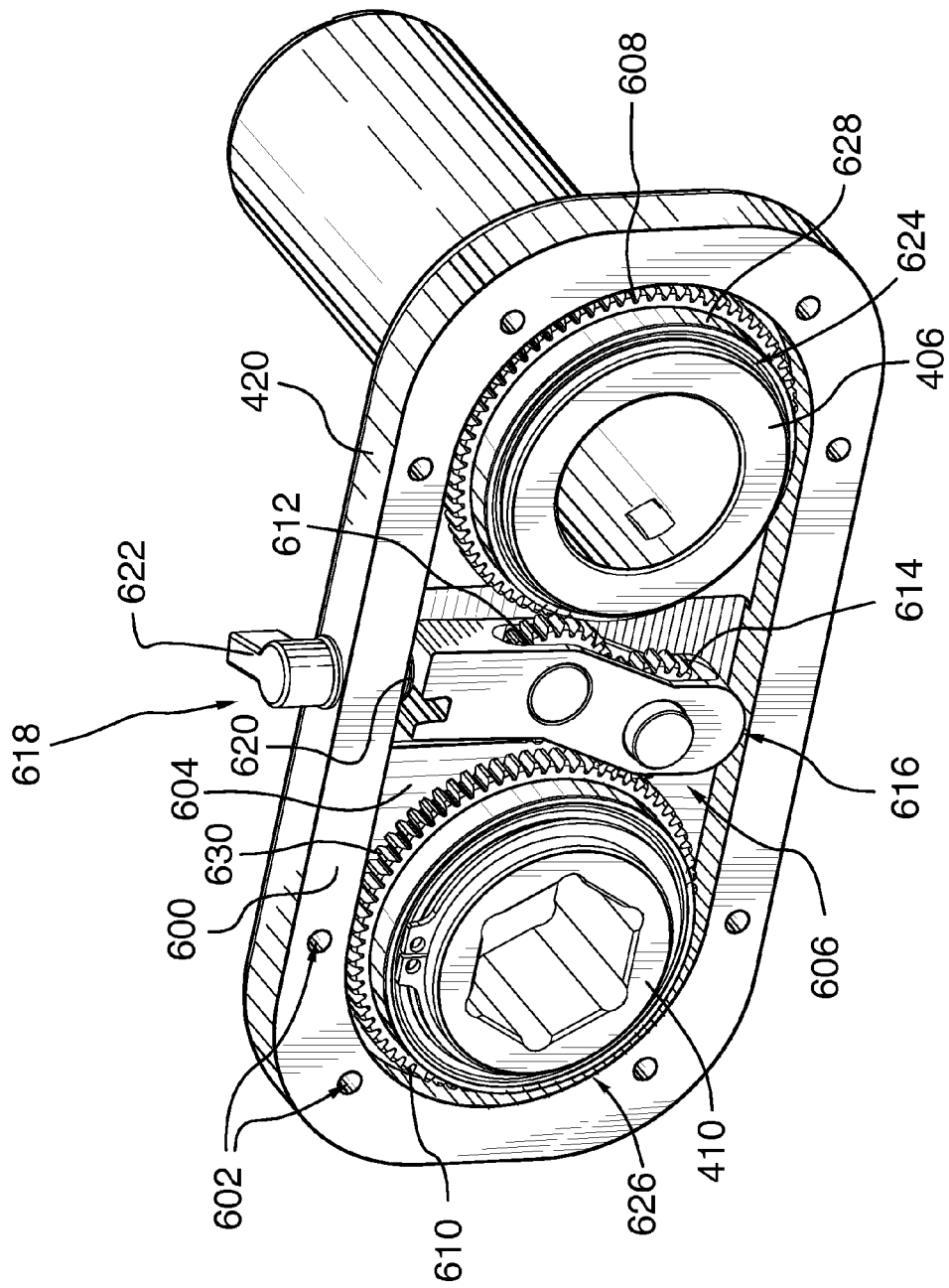
FIG. 6 is another perspective view of the transmission device shown in FIG. 4, showing internal components of the transmission device.

Referring specifically to FIG. 6, the first casing portion 420 comprises a perimeter surface 600 on which are provided a plurality of threaded holes 602 for receiving the fasteners 424 and an obround recess 604 extending below the perimeter surface 600 for receiving the annular driven gear 402 and the annular driving gear 404.

The second casing portion 422 is shaped generally similarly to the first casing portion 420, but is generally planar and thus does not comprise a recess such as the obround recess 604. Instead, the second casing portion 422 acts as a cover when placed over the first casing portion 420. Specifically, the second casing portion 422 comprises a plurality of through holes 812 defined along its perimeter. When the first and second casing portions 420, 422 are placed together and the fasteners 424 are inserted through the through holes 812 and engaged into the threaded holes 602 of the perimeter surface, the second casing portion 422 protects the annular driving gear 404, the annular driven gear 402 and the transmission means 606.

In the illustrated embodiment, the annular driven gear 402 comprises an inner section 406 adapted for a substantially tight fit around the driven shaft 104. Specifically, the inner section 406 defines a first central opening 408 which is sized and shaped to receive the welding shaft 104*a*. Similarly, the annular driving gear 404 also comprises an inner section 410 defining a second central opening 412 which is adapted for a substantially tight fit around the feed screw 110 and for rotating simultaneously therewith.

The inner section 406 of the annular driven gear 402 further comprises engaging means 414, for engaging and rotating simultaneously with the driven shaft 104 and sliding over the same.

In the illustrated embodiment, the engaging means 414 comprise a male portion, such as an internal key 416 extending generally radially inside the inner section 406, for engaging a corresponding female mating portion, such as a longitudinal keyway 220, best shown in FIG. 2, defined on the welding shaft 104*a*. The internal key 416 is adapted for sliding in substantially tight fit manner within the longitudinal keyway 220. It will be appreciated that this configuration, while preventing the rotation of the annular driven gear 402 relative to the welding shaft 104*a*, still allows the welding shaft 104*a* to be moved axially towards and away from the workpiece 152 by the feed mechanism 108.

Alternatively, the welding shaft 104*a* may instead have a given non-circular cross-section and the first central opening 408 may be shaped accordingly to complementarily receive the welding shaft 104*a*. For instance, the welding shaft 104*a* may have a hexagonal cross-section and the first central opening 408 may be correspondingly hexagonal. It will be appreciated that the engaging means 414 may in fact comprise any means known to the skilled addressee for preventing rotation of the annular driven gear 402 relative to the welding shaft 104*a* while still allowing axial movement of the driven shaft 104.

Similarly, the inner section 410 of the annular driving gear 404 is also configured for preventing rotation of the annular driving gear 404 relative to the feed screw 110 once the feed screw 110 is received in the inner section 410.

In the illustrated embodiment, the second central opening 412 of the inner section 410 and the root portion 304 of the feed screw 110 haves complementary shapes. In the illustrated embodiment, the root portion 304 has a hexagonal cross-section, as best shown in FIG. 3. The second central opening 412 is therefore also hexagonal and is sized to snugly receive the root portion 304 of the feed screw 110. It will be appreciated that this configuration advantageously enables efforts applied to the annular driving gear 404 by the feed screw 110 to be suitably distributed around the annular driving gear 404.

It will be appreciated that the second central opening 412 and the root portion 304 of the feed screw 110 may be shaped according to one of other various shapes. For instance, the second central opening may instead be square and the root portion 304 of the feed screw 110 may have a corresponding square cross-section. A person skilled in the art will understand that the second central opening 412 may have any non-circular shape deemed suitable by the skilled addressee, provided that the root portion 304 of the feed screw 110 has a corresponding cross-section to prevent rotation of the annular driving gear 404 relative to the feed screw 110.

Alternatively, the feed screw 110 may instead comprise a key and the inner section 410 of the annular driving gear 404 may comprise a corresponding keyway sized and shaped to receive the key. In yet another embodiment, the key may instead be provided in the second annular member 410 and the corresponding keyway may be provided on the feed screw 110.

Figure 4:
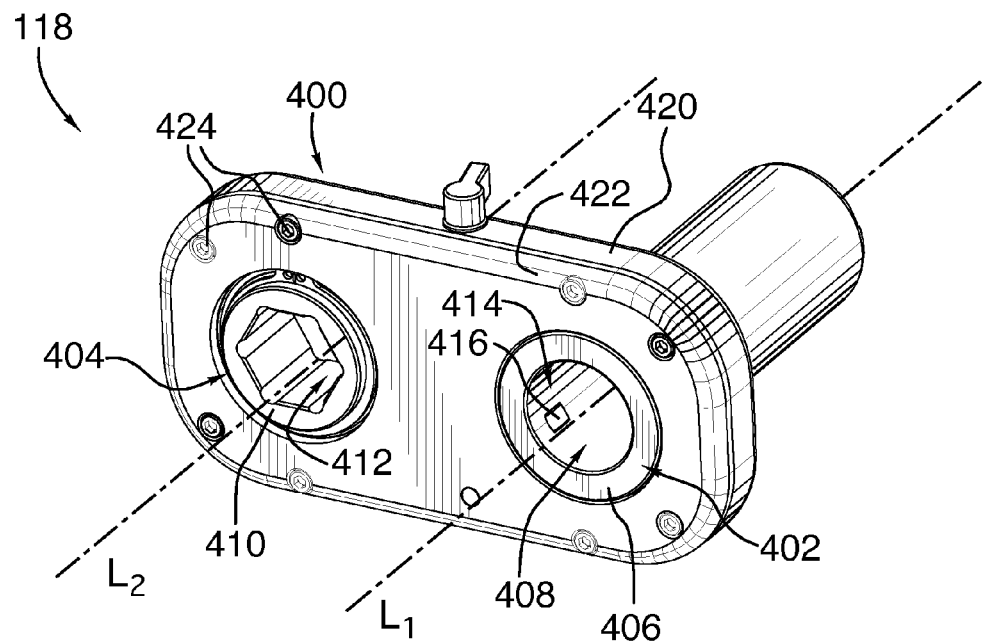
FIG. 4 is a perspective view of a transmission device for the portable boring-welding apparatus shown in FIG. 1, in accordance with one embodiment.
Figure 5:
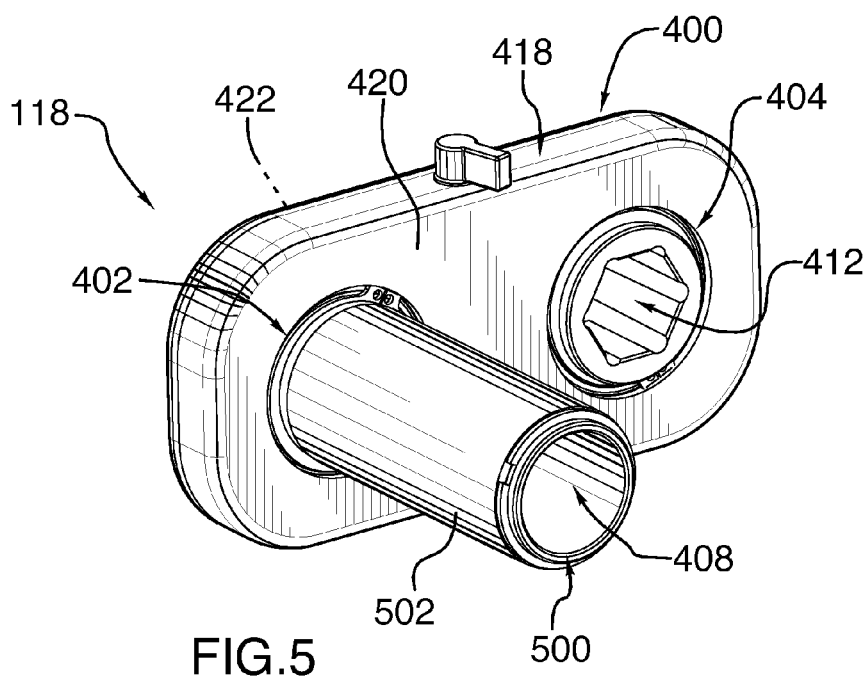
FIG. 5 is another perspective view of the transmission device shown in FIG. 4.

As shown in FIG. 4, the first and second central openings 408, 412 of the annular driven and driving gears 402, 404 respectively define first and second longitudinal rotation axes $L_1$, $L_2$. The annular driven and driving gears 402, 404 are mounted in the rigid casing 400 such that the first and second longitudinal rotation axes $L_1$, $L_2$ are disposed parallel to each other.

The annular driving gear 404 further comprises an intermediate section 626 rotating with its inner section 410. The intermediate section 626 cooperates with the first enclosure 810a to provide a secure rotatable connection of the annular driving gear 404 relative to the rigid casing 400.

Specifically, the annular driving gear 404 comprises a pair of spaced-apart bearings 822 mounted concentrically around the inner section 410 of the annular driving gear 404. The bearings 822 are prevented from moving axially relative to the inner section 410 by a pair of circlips 824 which engage corresponding annular grooves 826 defined on the inner section 410.

Similarly, the annular driven gear 402 also comprises an intermediate section 624 rotating with the inner section 406. The intermediate section 624 cooperates with the second enclosure 810b to provide a secure rotatable connection of the annular driven gear 402 relative to the rigid casing 400.

More specifically, the intermediate section 624 of the annular driven gear 402 comprises a pair of spaced-apart bearings 814 mounted concentrically around the inner section 406. The bearings 814 are prevented from moving axially relative to the inner section 406 by an annular lip 816 extending radially and outwardly from the inner section 406 and by a circlip 818 which engage a corresponding annular groove 820 defined on the inner section 406.

It will be appreciated that although circlips are used to prevent axial movement of various parts of the transmission device 118, they may be replaced by snap rings or any other retaining rings deemed suitable by a skilled person.

The annular driving gear 404 further comprises an outer section 630 rotating with the inner section 410. The outer section 630 comprises driving means 702 for forwarding rotational motion of the inner section 410 to transmission means 606.

Specifically, the driving means 702 comprise a first externally toothed ring 610 concentrically mounted around the inner section 410 of the annular driving gear 404. The first externally toothed ring 610 is located between the bearings 822 of the annular driving gear 404 and is prevented from rotating relative to the inner section 410 by a first key 830 extending radially and outwardly from the inner section 410, which engages a corresponding first indent 832 defined on the first externally toothed ring 610.

Similarly, the annular driven gear 402 also comprises an outer section 628 rotating with the inner section 406. The outer section comprises driven means 704 for forwarding to the inner section 406 rotational motion received from the transmission means 606.

Specifically, the driven means 704 comprise a second externally toothed ring 608 located between the bearings 814 of the inner section 406 and is prevented from rotating relative to the inner section 406 by a second key, not shown, extending radially and outwardly from the inner section 406, which engages a corresponding second indent 828 defined on the second externally toothed ring 608.

The transmission means 606 are rotatively connected to the outer sections 630, 628 of the annular driving gear 404 and annular driven gear 402 for transmitting rotational movement of the feed screw 110 to the driven shaft 104.

In one embodiment, the transmissions means 606 are disengageable and comprise an engaged position wherein rotation of the feed screw 110 and of the annular driving gear 404 causes the rotation of the annular driven gear 402 and of the driven shaft 104; and a disengaged position wherein the feed screw 110 and the annular driving gear 404 are allowed to rotate without causing the rotation of the annular driven gear 402 and of the driven shaft 104.

In the illustrated embodiment, the transmission means 606 comprise a switch 618 to be operated by a user. The switch 618 extends outwardly from the rigid casing 400 for selectively setting the transmission means 606 between the engaged or the disengaged positions.

Specifically, as seen in FIG. 6, the switch 618 comprises an elongated coupling member, or elongated bracket 616, pivotably mounted between the annular driving gear 404 and the annular driven gear 402. The switch 618 further comprises at least one connecting gear, specifically first and second connecting gears 612, 614 in the illustrated embodiment, which are rotatably mounted to the elongated bracket 616 for engaging the outer portion 630, 628 of at least one of the annular driving gear 404 and the annular driven gear 402.

Figure 9:
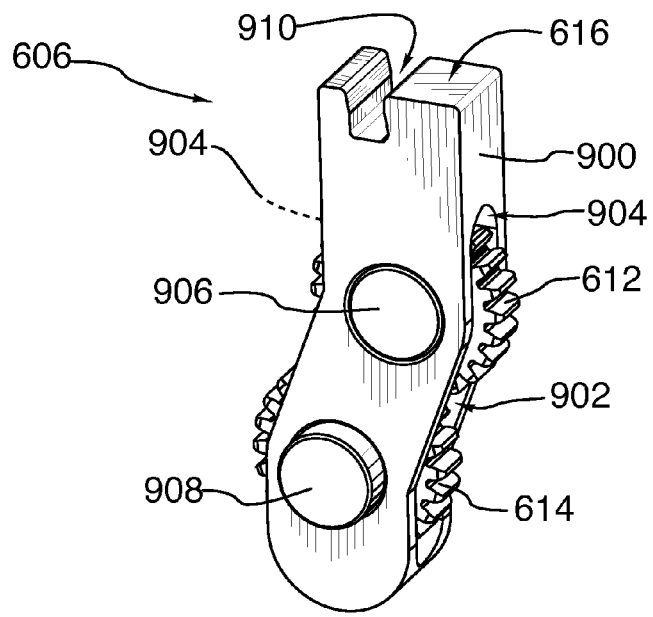
FIG. 9 is a perspective view of an elongated bracket for the transmission device shown in FIG. 4, provided with two connecting gears.
Figure 10:
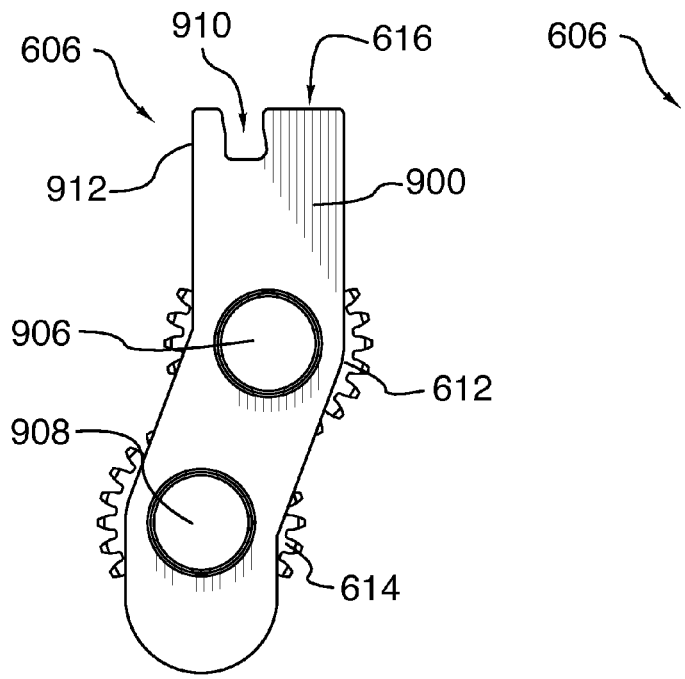
FIG. 10 is a front elevation view of the elongated bracket shown in FIG. 9.
Figure 11:
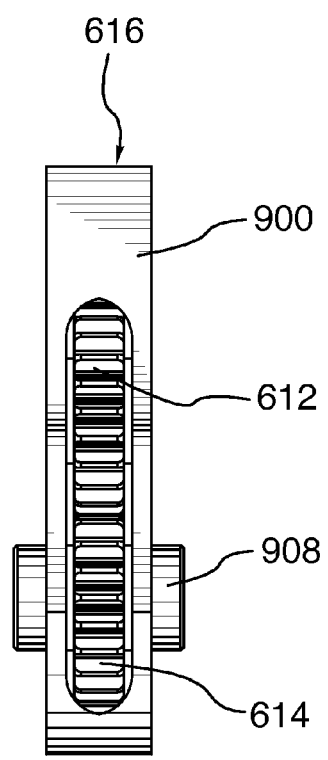
FIG. 11 is a left side elevation view of the elongated bracket shown in FIG. 9.

Referring specifically to FIGS. 9 to 11, the bracket 616 comprises a bracket body 900 in which is defined an internal cavity 902 provided with lateral openings 904 to allow each of the first and second connecting gears 612, 614 housed in the internal cavity 620 to mesh with one of the first and second externally toothed rings 610, 608, as shown in FIGS. 6 and 7. The first connecting gear 612 is rotatably mounted to the bracket 616 by a first pin 906 which extends through the bracket body 900 and through the first connecting gear 612. The second connecting gear 614 is rotatably mounted to the bracket 616 by a second pin, or pivot pin 908, which extends through the second connecting gear 614 and through the bracket body 900. The pivot pin 908 further protrudes from the bracket body 900 towards the first and second casing portions 420, 422, as shown in FIG. 11, and engages corresponding circular recesses 834, best shown in FIG. 8, defined in the first and second casing portions 420, 422.

According to this configuration, when the first and second casing portions 420, 422 are fastened together, the pivot pin 908 is free to pivot, but may not move laterally relative to the rigid casing 400, because the ends of the pivot pin 908 are engaged in the corresponding circular recesses 834.

It will also be seen from FIGS. 9 and 10 that the bracket 616 is not straight, but is slightly bent. This configuration allows the second connecting gear 614 to be positioned adjacent one of the first and second externally toothed rings 610, 608, while the first connecting gear 612 may be selectively moved towards and away from the other one of the first and second externally toothed rings 610, 608 by pivoting the bracket 616 about the pivot pin 908, as will become apparent below.

The switch 618 further comprises a position selector 706 rotatably mounted to the rigid casing 400 and operable by the user for selectively moving the elongated bracket 616 between the engaged position and the disengaged position. In the disengaged position, at least one of the first and second connecting gears 612, 614 is spaced from at least one of the annular drive gear 404 and the annular driven gear 402. In the engaged position, the at least one of the first and second connecting gears 612, 614 engages both the annular driving gear 404 and the annular driven gear 402 thereby transmitting rotational movement of the annular driving gear 404 to the annular driven gear 402.

Figure 7A:
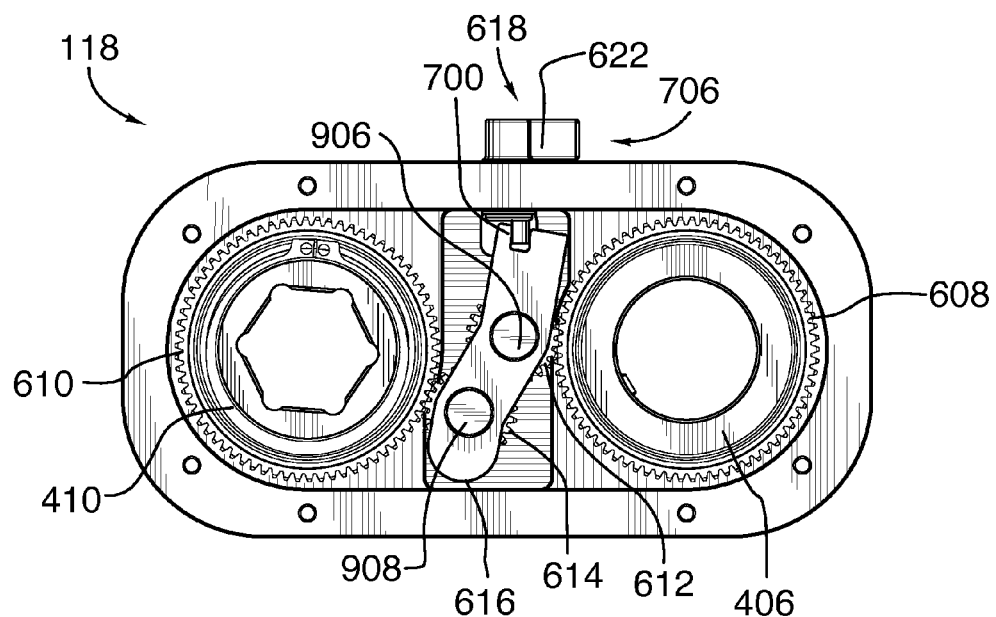
FIG. 7A is a front elevation view of the transmission device shown in FIG. 4, with the second casing portion removed and the switch in the engaged position.
Figure 7B:
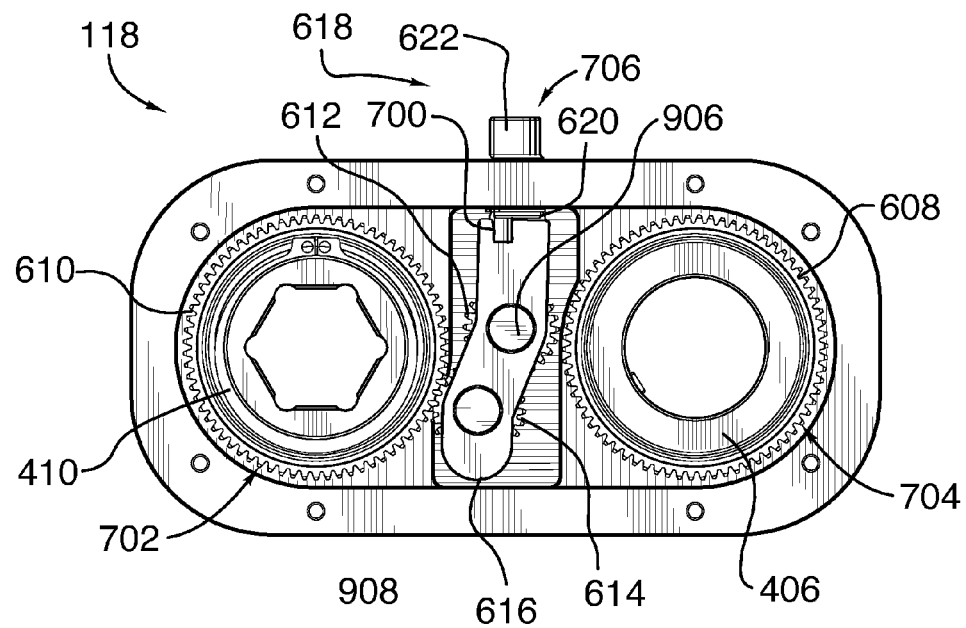
FIG. 7B is a front elevation view of the transmission device shown in FIG. 7A, with the switch in the disengaged position.
Figure 8:
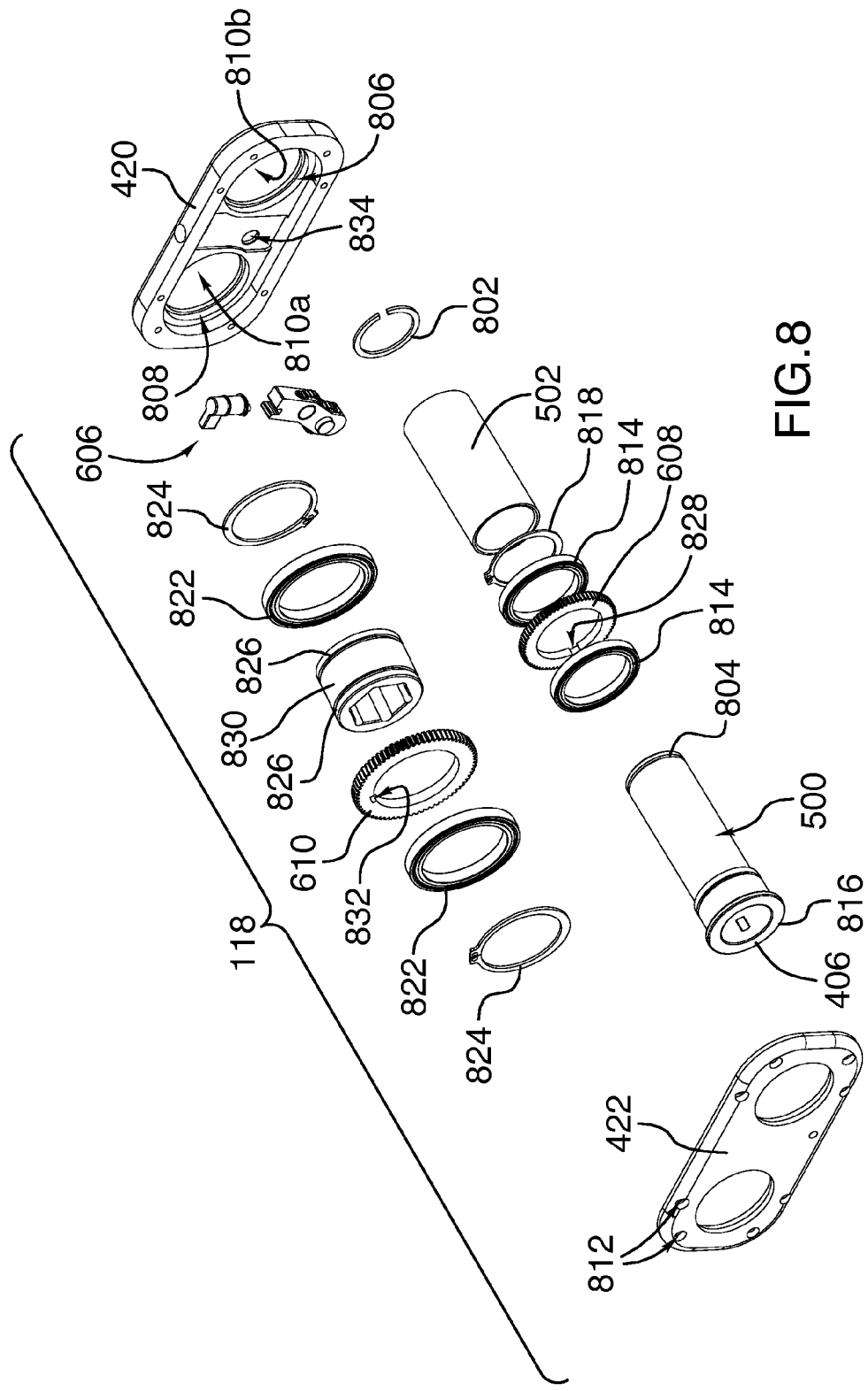
FIG. 8 is an exploded view of the transmission device shown in FIG. 4.

The position selector 706 comprises a cylindrical member 620, best shown in FIGS. 7A and 7B, which extends through the perimeter portion 600 of the first casing portion 420. The cylindrical member 620 may be pivoted using a handle portion 622 located outside the rigid casing 400 and adapted to be operated manually by the user, such that the switch 618 may be easily controlled when the rigid casing 400 is closed.

A finger portion 700 extends downwardly from the cylindrical member 620 and engages a corresponding groove 910 which extends in an upper part 912 of the bracket body 900, parallel to the pivot pin 908. The finger portion 700 is off-centered relative to the cylindrical member 620 to move along a circular path when the cylindrical member 620 is pivoted. It will be appreciated that when the finger portion 700 moves along a circular path, it also moves laterally towards one of the first and second gears 608, 610. This lateral movement of the finger portion 700 causes the upper part 912 of the bracket 616 to also move laterally, and therefore causes the bracket 616 to pivot about the pivot pin 908 when the handle portion 622 is operated.

FIG. 7A shows the switch 618 in the engaged position. The second connecting gear 614 is positioned adjacent the first externally toothed ring 610 such that the first externally toothed ring 610 and the second connecting gear 614 are always intermeshed. The first pin 906 is further positioned relative to the pivot pin 908 such that the first and second connecting gears 612, 614 are always intermeshed. In this position, the first connecting gear 612 is further positioned adjacent the second externally toothed ring 608 and is meshed therewith, thereby allowing rotation of the annular driving gear 404 to be transmitted to the annular driven gear 402.

FIG. 7B shows the switch 618 in the disengaged position. In this embodiment, to move between the engaged position and the disengaged position, the handle portion 622 is pivoted by a quarter turn. In this position, the second connecting gear 614 is still meshed with the first externally toothed ring 610 and with the first connecting gear 612, but the first connecting gear 612 is spaced from the second externally toothed ring 608 and is no longer meshed therewith, such that rotation of the annular driving gear 404 is no longer transmitted to the annular driven gear 402.

It will be appreciated that the switch 618 advantageously allows the feed mechanism 108 to be easily and quickly decoupled from the welding shaft 104a, for instance to move the welding shaft 104a axially using the feed mechanism 108 in order to change the position of the welding tool 106 on the inner wall 154 of the bore 150 without rotating the welding tool 106 along the inner wall 154.

Alternatively, the first and second externally toothed rings 610, 608 may instead be coupled together by a single connecting gear intermeshed with both the first and second externally toothed rings 610, 608, or by any other arrangement of connecting gears deemed to be suitable by a skilled person.

In another embodiment, the first and second externally toothed rings 610, 608 may instead be coupled using a closed-loop chain engaging both gears 608, 610. In yet another embodiment, the annular driving and driven gears 404, 402 may be located adjacent each other such that the first and second externally toothed rings 610, 608 are directly intermeshed.

In yet another embodiment, the annular driving and driven gears 404, 402 do not comprise first and second externally toothed rings 610, 608, but are instead coupled in rotation by a closed-loop belt extending therearound.

The inner section 406 of the annular driven gear 402 further comprises a tubular portion 500 which extends outwardly from the rigid casing 400 through the second circular opening 810b. The tubular portion 500 has a diameter which is slightly smaller than the diameter of the inner section 406 of the annular driven member 402, thereby defining an annular shoulder between the inner section 406 and the tubular portion 500.

The tubular portion 500 is adapted to fit around the welding shaft 104a and to be inserted in the inner sleeve 120 of the portable boring-welding apparatus 100 in a substantially tight fit, thereby supporting the device when the rigid casing 400 is mounted on the feed screw 110 and on the welding shaft 104a. The inner sleeve 120 is preferably adapted to be tightened around the tubular portion 500 and secure in place the transmission device 100. An outer sleeve 502 is further concentrically engaged over the tubular portion 500 and is prevented from moving axially relative to the tubular portion 500 by the annular shoulder 800 and by a circlip 802 engaged in a corresponding annular groove 804 defined on the tubular portion 500. The outer sleeve 502 thereby prevents the tubular portion 500 from contacting the inner sleeve 120. The outer sleeve 502 may be made from a material providing relatively low friction and electric insulation, such as nylon or the like, to prevent transmission of electric current from the welding torch 122 to the boring device, and to allow the annular driven gear 402 to rotate inside the inner sleeve 120 of the body 102 without causing the inner sleeve 120 to rotate relative to the body 102. This allows the welding shaft 104a to rotate without rotating the boring actuator 116 coupled to the inner sleeve 120 of the body 102, which advantageously eliminates the need to uncouple the boring actuator 116 from the inner sleeve 120 or even to entirely remove the boring actuator 116 from the apparatus 100 during welding.

Now referring to FIGS. 1, 2, 3, 12 and 13, the operation of the apparatus 100 will now be described, in accordance with one embodiment.

Figure 12:
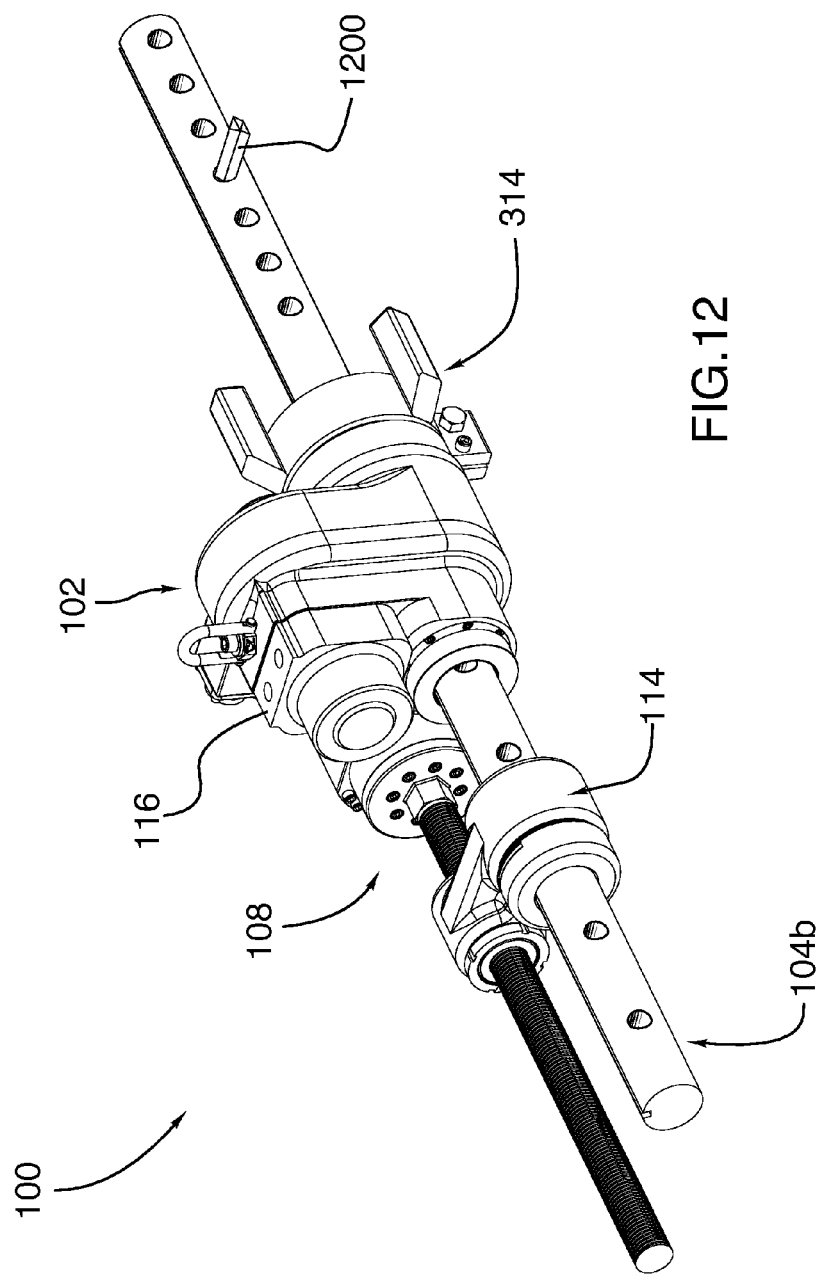
FIG. 12 is a perspective view of the portable boring-welding apparatus shown in FIG. 1, with a boring shaft installed instead of the welding shaft and with the transmission device removed.

Referring specifically to FIG. 12, the apparatus 100 may first be used to perform a boring operation. In this case, the boring shaft 104b is inserted in the inner sleeve 120 of the body 102 and the boring actuator 116 is connected to the source of hydraulic fluid. The apparatus 100 is mounted to the workpiece using the mounting assembly 314 such that the boring shaft 104b extends along the longitudinal axis of the bore 150. The boring shaft 104b may be rotated using the boring actuator 116, and the boring shaft 104b may be moved axially using the feed mechanism 108. The boring actuator 116 may be controlled independently from the feed mechanism 108 or, as explained above, the boring actuator 116 and the feed mechanism 108 may both be controlled using a common control unit. In this configuration, the transmission device 118 is not mounted on the apparatus 100.

It will be appreciated that although a single boring tool is illustrated in FIG. 12, the boring shaft 104b may in fact be provided with a plurality of boring tools positioned at various locations on the boring shaft 104b. This configuration allows a plurality of aligned bores to be machined at the same time.

Figure 13:
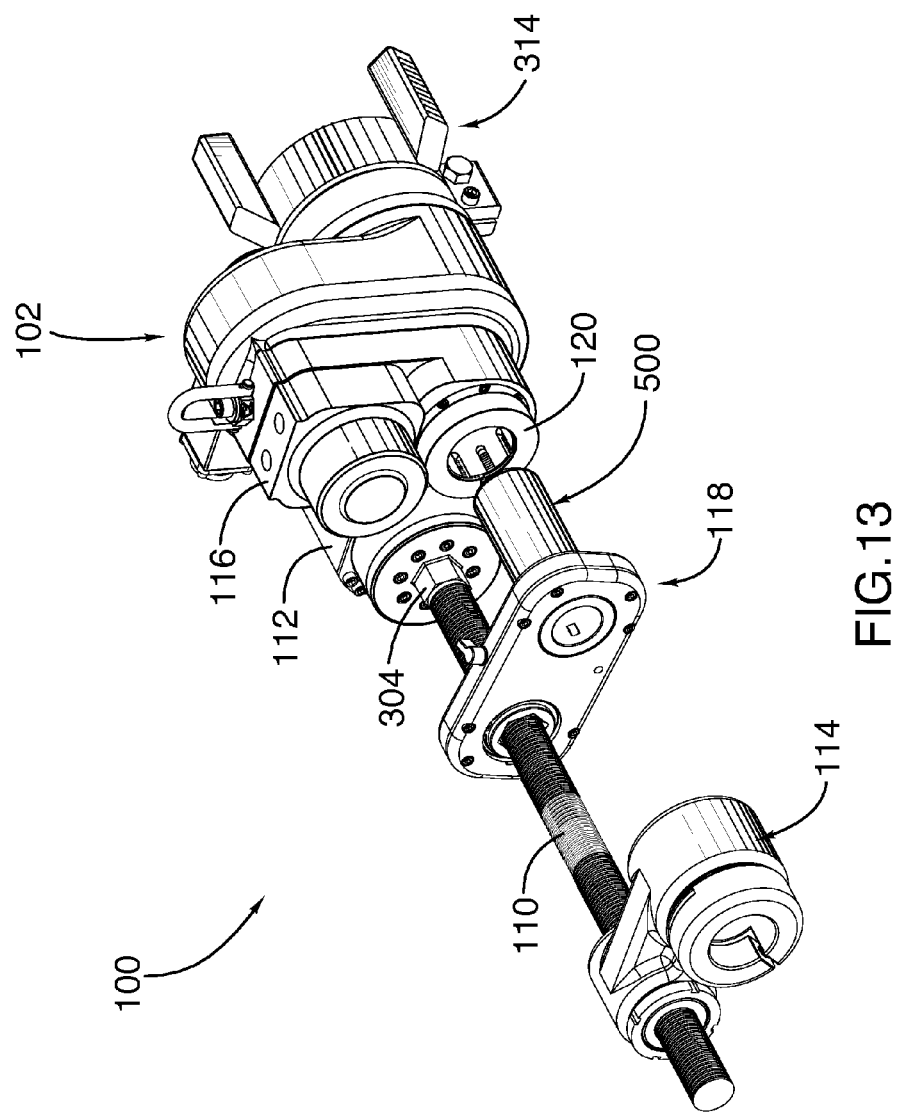
FIG. 13 is a perspective view of the portable boring-welding apparatus shown in FIG. 1, with the boring shaft removed and the transmission device partially installed.

Referring now to FIG. 13, the apparatus 100 may then be used to perform a welding operation. In this case, the boring shaft 104b is removed from the body 102 and the transmission device 118 is mounted to the body 102 of the apparatus 100. Specifically, the inner section 410 of the annular driving gear 404 is concentrically engaged over the feed screw 110 and the cylindrical sleeve portion 500 of the annular driven gear 402 is aligned with the inner sleeve 120 of the body 102. It will be appreciated that to engage the inner section 410 of the annular driving gear 404 over the feed screw 110, the connecting member 114 of the feed mechanism 108 is first removed from the apparatus 100. Once the inner section 410 of the annular driving gear 404 is concentrically engaged over the feed screw 110, the first opening 308 of the connecting member 114 may then be re-engaged on the feed screw 110.

The transmission device 118 is then moved towards the body 102 of the apparatus 100 until the root portion 304 of the feed screw 110 engages the second central opening 412 of the annular driving gear 404. Simultaneously, the cylindrical sleeve portion 500 engages the inner sleeve 120 of the body 102. The welding shaft 104a may then be inserted in the first central opening 408 of the annular driven gear 402, with the internal key 416 engaging the longitudinal keyway 220 of the welding shaft 104a. The boring actuator 116 may further be disconnected from the source of hydraulic fluid, because the boring actuator 116 is unused during welding. The apparatus 100, now configured as shown in FIGS. 1 to 3, may now be used to perform a welding operation. Specifically, the feed shaft 110 may be rotated using the feed actuator 112 such that rotational movement of the feed screw 110 is forwarded to the welding shaft 104a by the transmission device 118.

In the illustrated embodiment, the welding shaft 104a has a smaller diameter than the boring shaft 104b. For instance, the boring shaft 104b may have a diameter of 2 inches and the welding shaft 104a may have a diameter of 1½ inches. According to this configuration, the welding shaft 104a is insertable through the inner sleeve 120 without contacting the inner sleeve 120. During welding, the cylindrical sleeve portion 500 of the transmission device 118 is therefore engaged in the inner sleeve 120 of the body 102, but the welding shaft 104a itself does not contact the inner sleeve 120, which is sized to snuggly receive the boring shaft 104b. It will be appreciated that the boring shaft 104b may require support from the inner sleeve 120 to remain aligned with the longitudinal axis of the bore 150 since the inner wall 154 of the bore 150 opposes resistance to the boring tool 1200 during boring, but that support from the inner sleeve 120 may not be required to support the welding shaft 104a during welding since the inner wall 154 does not oppose resistance to the welding tool 106 during welding.

It will be appreciated that this configuration allows boring and welding to be performed successively without having to dismount the apparatus 100 from the workpiece 152, which advantageously reduces the time required to repair the bore 150.

Furthermore, it will be understood that in an alternative embodiment, the welding operation may instead be performed before the boring operation. In this case, the transmission device 118 and the welding shaft 104a are removed from the apparatus 100 after welding, and the boring shaft 104b is then inserted in the body 102 of the apparatus 100 for the boring operation.

It will be appreciated that the apparatus 100 may be configured according to one of various other configurations.

For instance, instead of being connected to the feed screw 110, the welding shaft 104a may instead be coupled directly to the feed actuator 112. Furthermore, instead of being provided with a boring shaft 104b and a welding shaft 104a, the apparatus 100 may instead be provided with a single shaft on which are mounted both a welding tool and a boring tool. In yet another embodiment, instead of being removable, the transmission device 118 may instead be secured to the body 102 of the apparatus 100, or even be provided inside the housing 204 of the body 102 and form an integral part of the body 102.

Figure 14:
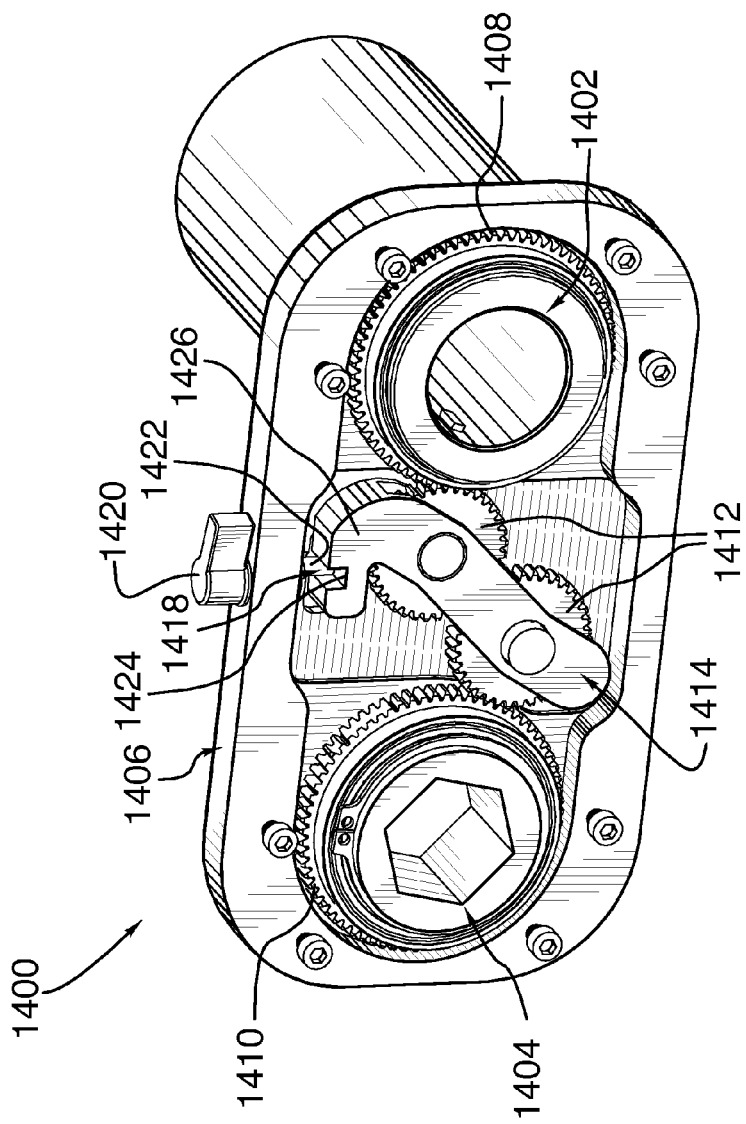
FIG. 14 is a perspective view of a transmission device, in accordance with an alternative embodiment, with the second casing portion removed to show internal components of the transmission device.

Now referring to FIG. 14, there is shown a transmission device 1400, according to an alternative embodiment. The transmission device 1400 is generally similar to the transmission device shown in FIGS. 4 to 11 and comprises annular driving and driven gears 1404, 1402 rotatably mounted in a rigid casing 1406. First and second externally toothed rings 1410, 1408 are concentrically mounted around the annular driving and driven gears 1404, 1402, respectively. The first and second externally toothed rings 1410, 1408 are interconnected by a pair of connecting gears 1412 mounted in a bracket 1414. In this embodiment, the bracket 1414 is generally hook-shaped to allow the connecting gears 1412 to interconnect the first and second externally toothed rings 1410, 1408, which are located farther apart than in the embodiment shown in FIGS. 4 to 11. The transmission device 1400 further comprises a switch comprising a cylindrical member 1418 pivotable using a handle portion 1420 and a generally cylindrical finger portion 1422 extending away from the cylindrical member 1418 to engage a groove 1424 defined in an upper part 1426 of the bracket 1414. Operation of the transmission device 1400 is similar to the operation of the transmission device 118 shown in FIGS. 4 to 11.

Although the above description relates to a specific preferred embodiment as presently contemplated by the inventor, it will be understood that the invention in its broad aspect includes mechanical and functional equivalents of the elements described herein.

The invention claimed is:

1. A portable boring-welding apparatus for boring and welding a workpiece, comprising:
   an external housing adapted to be removably secured to the workpiece in alignment with a bore thereof so as to enable a welding tool and a boring tool to access the bore, the external housing comprising a cylindrical channel for detachably receiving a welding shaft, to which the welding tool is attached, through the external housing;
   a feed motor secured inside the external housing, the feed motor being coupled to a feed shaft for rotating the feed shaft at a substantially low rotation speed suitable for welding the workpiece via the welding tool, the feed shaft having a longitudinal axis of rotation extending parallel to a longitudinal axis of the welding shaft and being operatively connected to the welding shaft for displacing the welding shaft axially along the longitudinal axis of the welding shaft through the circular housing opening upon rotation of the feed shaft about the longitudinal axis of rotation of the feed shaft; and
   a transmission device configured for transmitting rotational movement of the feed shaft to the welding shaft to rotate the welding shaft when the transmission device is actuated to a first position, and configured such that the transmission device does not transmit the rotational movement of the feed shaft to the welding shaft to rotate the welding shaft when the transmission device is actuated to a second position, and wherein the rotational movement of the feed shaft is configured to cause the axial displacement of the welding shaft along the longitudinal axis of the welding shaft when the transmission device is in the first position and when the transmission device is in the second position.

2. The apparatus of claim 1, wherein the transmission device is removable and comprises:

a rigid casing configured to be removably mounted on the feed shaft and the welding shaft, the rigid casing comprising:

first and second circular casing openings for introducing said feed shaft and said welding shaft through the rigid casing, the first circular casing opening defining a first enclosure for receiving an annular driving gear and the second circular casing opening defining a second enclosure for receiving an annular driven gear;

the annular driving gear comprising
- an inner section adapted for a substantially tight fit around the feed shaft and for rotating simultaneously therewith,
- an intermediate section rotating with the inner section, the intermediate section cooperating with the first enclosure to provide a secure rotatable connection of the annular driving gear relative to the casing, and
- an outer section rotating with the inner section, the outer section comprising driving means for forwarding rotational motion of the inner section to the transmission device, the annular driven gear comprising
- an inner section adapted for a substantially tight fit around the welding shaft, the inner section of the annular driven gear comprising engaging means for engaging and rotating simultaneously with the welding shaft and sliding over the same;
- an intermediate section rotating with the inner section of the annular driven gear, the intermediate section of the annular driven gear cooperating with the second enclosure to provide a secure rotatable connection of the annular driven gear relative to the casing, and
- an outer section rotating with the inner section of the annular driven gear, the outer section of the annular driven gear comprising driven means for forwarding to the inner section of the annular driven gear rotational motion received from the transmission device; and the transmission device being rotatively connected to the outer section of the annular driving gear and the outer section of the annular driven gear for transmitting rotational movement of the feed shaft to the welding shaft.

3. The apparatus of claim 1, wherein the welding shaft is interchangeable with a boring shaft to which the boring tool is attached and adapted to be rotated at a substantially high rotation speed.

4. The apparatus of claim 3 further comprising a boring motor secured inside the external housing, the boring motor being operatively coupled to the boring shaft for rotating the boring shaft at the substantially high rotation speed.

5. The apparatus of claim 4, wherein the feed motor is an electric motor and the boring motor is a hydraulic motor.

6. The apparatus of claim 4 further comprising a rotating sleeve adapted for engaging and rotating simultaneously with the boring shaft and sliding over the same, the rotating sleeve rotatably engaging the cylindrical channel and cooperating therewith to provide a rotation of the boring shaft relative to the external housing, the rotating sleeve comprising coupling means for coupling the rotating sleeve to the boring motor such that the rotating sleeve rotates when the boring motor is actuated.

7. The apparatus of claim 6, wherein the welding shaft has a smaller diameter than the boring shaft and is insertable through the rotating sleeve without contacting said sleeve.

\* \* \* \* \*